PULSE AMPLIFIER INCLUDING TRANSISTORS

Filed Dec. 19, 1958 5 Sheets-Sheet 1

INVENTORS
THEODOR E. EINSELE
HORST VON DER HEYDEN

BY William V. Schelberg
AGENT

July 25, 1961 T. E. EINSELE ET AL 2,994,003

PULSE AMPLIFIER INCLUDING TRANSISTORS

Filed Dec. 19, 1958 5 Sheets-Sheet 2

July 25, 1961 T. E. EINSELE ET AL 2,994,003

PULSE AMPLIFIER INCLUDING TRANSISTORS

Filed Dec. 19, 1958 5 Sheets-Sheet 4

July 25, 1961 T. E. EINSELE ET AL 2,994,003

PULSE AMPLIFIER INCLUDING TRANSISTORS

Filed Dec. 19, 1958

5 Sheets-Sheet 5

United States Patent Office 2,994,003

Patented July 25, 1961

2,994,003

PULSE AMPLIFIER INCLUDING TRANSISTORS

Theodor E. Einsele, Sindelfingen, and Horst von der Heyden, Boblingen, Germany, assignors to International Business Machines Corporation, New York, N.Y., a corporation of New York Filed Dec. 19, 1958, Ser. No. 781,651

14 Claims. (Cl. 307—88.5)

This invention relates to pulse amplifying circuits and more particularly to pulse amplifying circuits which employ transistors.

A random access magnetic memory has been described in an article by Jan W. Forrester, in the Journal of Applied Physics, January 1951, page 44, entitled, "Digital Information Storage in Three Dimensions Using Magnetic Cores," wherein each of the cores must be capable of attaining bistable states of flux density in representing binary information and is switched from one to another of the stable states by a coincidence of current pulses applied to suitable driving windings. Information is stored in a core by coincidently energizing two drivers with pulses of one polarity, and information is read out of this core by coincidently energizing the same two drivers with pulses of an opposite polarity. The magnitude of the pulses in each of the drivers is restricted to one-half the magnetizing current necessary to saturate a core and yet must be less than the coercive force threshold of the core. Such memories, when utilized in high speed computing machines, must be capable of performing switching operations in the order of one microsecond and the drivers are required to deliver currents in the order of some hundred milliamperes. It has been found that transistors which are capable of switching such large currents and have a corresponding short rise time are well suited to drive such memories.

Two well-known transistor-type drive circuits are the grounded-base and the grounded-emitter type. In the grounded-base type circuits, the high control output of the emitter and the high power loss in the transistor when in its operative condition are objectional features, while in the grounded-emitter type circuit the required output current, $Im/2$, which is half the magnetization current necessary to cause reversal of a magnetic core, is maintained by operating the transistor in the saturation range while employing a fixed high-ohm source of potential, a forced-current circuit, which, in the off or blocked condition, exceeds the permissible biasing potential of the transistor.

A transistor drive circuit, in accordance with this invention, may be constructed having a high-voltage battery connected in series with a high resistance to constitute a first branch, and in parallel with the first branch, a low potential battery is series connected with a diode so poled that in the off condition of the transistor the diode is conductive and is maintained at a substantially constant value by the first branch high resistance and in the on condition the diode is non-conductive to switch the first branch high resistance into the load of the transistor. By this construction, the aforementioned objections are eliminated.

More specifically, in the circuit of this invention, when the transistor is in its off condition, no voltage higher than that of the low-potential battery can occur at the transistor and, until the transistor current is greater than that flowing through the diode, the rise time of the circuit current pulse is determined by the inductance of the line and the fixed battery voltage allowing the current to reach its maximum required value in the shortest time.

Further, by connecting two transistors, each of the same conductivity type, with the arrangement of batteries, resistance and diode, as set forth above, wherein the emitter and collector of one transistor is arranged in opposition to the other, a bi-polar driver for a magnetic core matrix is obtained.

Accordingly, it is a broad object of this invention to provide a novel pulse amplifying device.

A further object of this invention is to provide a pulse amplifying device which employs a transistor in combination with a controlled variable impedance load circuit.

Yet another object of this invention is to provide a novel bi-polar drive pulse amplifying device for a magnetic core memory.

Still another object of this invention is to provide a novel bi-polar transistor driver device which operates into a controlled load circuit to allow little power dissipation and a fast rise time.

Other objects of the invention will be pointed out in the following description and claims and illustrated in the accompanying drawings, which disclose, by way of example, the principle of the invention and the best mode, which has been contemplated, of applying that principle.

In the drawings.

The circuits and representations shown in the FIGS. 1 through 7 are to aid in an explanation of the problem and its solution by explaining operation of the basic transistor circuits, grounded-base and grounded-emitter, now employed. In the detailed description to follow it will be seen that of these basic transistor circuits, none are favorable to provide low current output, short switching time and power loss. Further, that the permissible demands upon the transistors with respect to the maximum connector voltage have to be exceeded in order to attain a sufficiently large current drive with short rise times.

Figure 1:
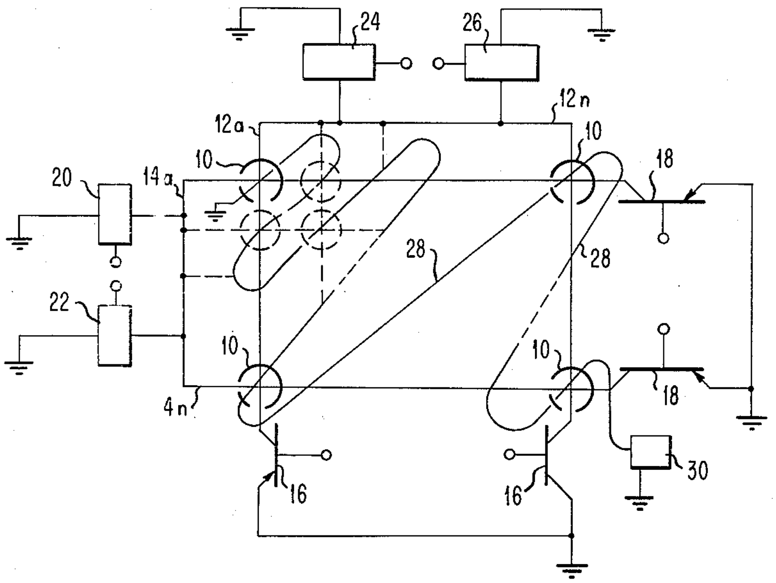
FIG. 1 PRIOR ART
FIG. 1 illustrates a memory matrix of magnetic switching cores.

Referring to the FIG. 1, an already proposed system for driving a magnetic core memory matrix is illustrated, wherein a plurality of magnetic cores 10 are arranged in columns and rows having column conductors **12*a*–12*n* and row conductors 14*a*–14*n*. Each of the column conductors 12*a*–12*n* is connected with a switching transistor 16, while similarly each of the row conductors 14*a*–14*n* is connected with a switching transistor 18. The row conductors 14*a*–14*n* are connected with a write driver 20 adapted when actuated, to provide half the coercive force ($H_0/2$) necessary to switch a core 10 from a datum or "0" stable remanence state, to an opposite or "1" stable remanent state hereinafter referred to as ($Im/2$) and to a read driver 22, adapted when actuated, to provide the same magnitude of field to the core 10, but of opposite polarity ($-H_0/2$), hereinafter referred to as ($-Im/2$). Similarly, the column conductors 12a–12$n$ are connected with a write driver 24 and a read driver 26. All cores 10 are linked by a sense winding 28 which terminates in an amplifier 30**.

Information is written into the memory when the write drivers 20 and 24 are actuated and a particular core is selected to store this information by unlocking one switching transistor 16 and one switching transistor 18 prior to the actuation of the drivers 20 and 24. This action is timed so that first the two selected transistors of the switches 16 and 18 are rendered conductive from their bases; thereafter, the leading edge of the $Im/2$ pulse supplied by the write drivers 20 and 24 appears, the write pulse then terminates and thereafter all switching transistors are again blocked. Thus, the switching transistors select one of the column and row conductors each, whereas the drivers supply the actual write or read pulse by duration and amplitude. This division of functions is a pre-requisite to the already proposed favorable operation of the switching transistors 16 and 18 as well as the circuit arrangement of the driver transistors according to this invention.

From the aforegoing discussion it is perceived that the write drivers 20 and 24, and the read drivers 22 and 26, must supply the magnetizing current required for the read-in and read-out of the desired magnetic core with the exact amplitude of $Im/2$ under the control of a timing pulse.

Figure 2:
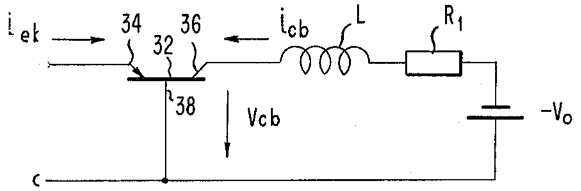
FIG. 2 PRIOR ART
FIG. 2 illustrates an equivalent-circuit diagram of a driver transistor in a grounded-base circuit connected with the matrix of FIG. 1.

Referring to the FIG. 2, a transistor 32 is provided, having an emitter 34, a collector 36, and a base connection 38. The collector 36 is serially connected with an impedance, which represents the matrix of FIG. 1, having a value L and $R_1$, a battery $-Vo$, and the base 38. The transistor 32 is a familiar junction transistor utilized in a grounded-base circuit. In explaining the operation of the circuit of FIG. 2, reference will be made to the FIG. 3 which represents operating points in the family of characteristic curves of the circuit shown in FIG. 2 and to the FIG. 4 which illustrates current and output curves for the circuit of FIG. 2 with respect to time.

In the circuit of FIG. 2, the current $Im/2$, referred to above, is determined by the transistor 32, due to the fact that the emitter 34 is fed with a current $i_{eb}$ having a magnitude $(Im/2)\times(1/\alpha)$. This is possible since the value of $1/\alpha$ almost constantly remains at a little higher than one. The control power required at the emitter 34 is relatively low, so that the large voltage variation possible at the collector 36 serves to obtain a corresponding power amplification.

Figure 3:
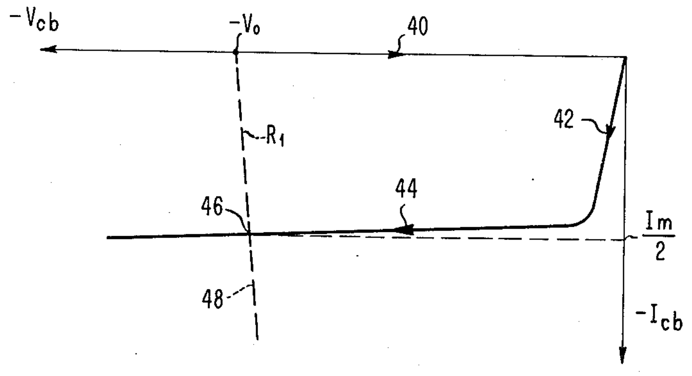
FIG. 3 represents operating points in the family of characteristic curves of the circuit shown in FIG. 2.
Figure 4:
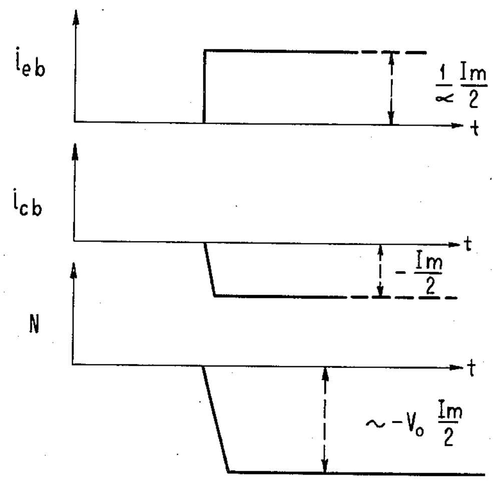
FIG. 4 illustrates current and output curves for the circuit of FIG. 2 with relation to time.

Prior to turn-on, the battery voltage $-Vo$ exists practically as collector-base voltage $V_{cb}$ and the operating point, with reference to the FIG. 3, designated by a point $-Vo$ on the curve. During the turn-on process, a pulse $i_{eb}$ is applied to the emitter as shown in the FIG. 4 and almost the entire voltage output is initially dropped across the inductance L. The operating point moves in correspondence with an arrow 40 in the FIG. 3, and as the counter voltage at the inductance L decreases, the operating point moves as indicated by an arrow 42 and an arrow 44 to an operating point 46. The operating point 46 is defined by the intersection of a load line 48 of the equivalent resistance $R_1$, with the collector current line $Im/2$ corresponding to an emitter current of $(Im/2)\times(1/\alpha)$. The equivalent resistance $R_1$, which substantially comprises the resistance of one of the switching wires 12$a$ . . . $n$ and 14$a$ . . . $n$, respectively, and the forward resistance of one of the switching transistors 16 or 18, will then be in the order of a few ohms, so that the collector-base voltage $V_{cb}$ existing at the transistor 32, which is carrying the full magnetizing current, almost equals the battery voltage $-Vo$.

As is seen, a large control current pulse $i_{eb}$ is provided which causes a correspondingly large power loss (shown in FIG. 4 by the curbe labled N) in the transistor 32 after it has been turned on. This large power loss is due to the large voltage, $V_{cb}$, which exists at the conductive transistor 32 after the end of the counter voltage pulse induced in the inductance L. The magnetizing current $i_{cb}$, or $Im/2$, however, has the short rise time desired. Thus, due to the magnetizing current $Im/2$, of some 100 milliamperes and with the high collector voltage $V_{cb}$ (approximately equal to $Vo$), the permissible power loss of the now available high-frequency transistors is exceeded, therefore necessitating a parallel arrangement of several transistors.

Figure 5:
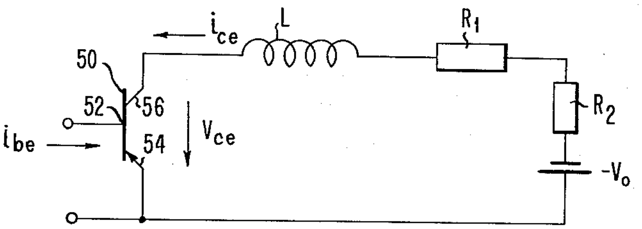
FIG. 5 PRIOR ART
FIG. 5 is an equivalent-circuit diagram of a transistor in a grounded-emitter circuit connected with the matrix of FIG. 1.
Figure 6:
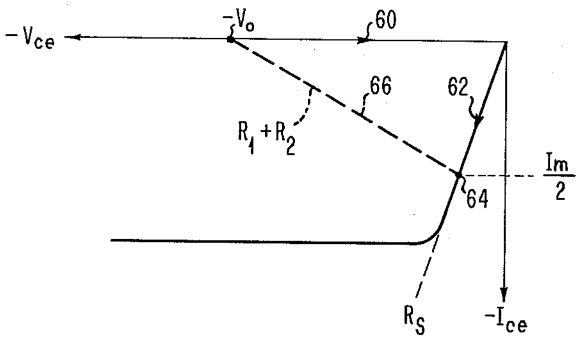
FIG. 6 represents operating points in the family of characteristic curves of a circuit of FIG. 5.

Referring to the FIG. 5, a grounded-emitter circuit is shown wherein a transistor 50 is provided having a base 52, an emitter 54, and a collector 56. The collector 56 is serially connected with the inductance L, resistance $R_1$, and battery $Vo$, as provided above with an additional large resistance $R_2$ added. Since the current flow, or magnetizing current $Im/2$ of the collector current $I_{ce}$, is related with the base current $i_{be}$ only through the variable value $$\alpha'=\frac{1}{1-\alpha}$$

(where $\alpha\approx0.90$ to $0.99$), the value of the collector current is fixed to the magnitude $Im/2$ by the high resistance $R_2$ included in the collector circuit and battery $-Vo$. Since the voltage $-Vo$ may not be higher than the permissible collector blocking voltage of the transistor 50, the voltage drop at the current limiting resistance $(R_1+R_2)$ serves to increase the rise time in accordance with the curve $i_{ce}$ shown in the FIG. 7. Immediately upon turn-on of the transistor 50, the entire voltage is almost all dropped across the inductance L, so that the operating point of the transistor 50 moves from the value $-Vo$, in the FIG. 6, as indicated by an arrow 60 and an arrow 62 to an operating point 64 with the collector current $i_{ce}$ of a magnitude $Im/2$.

Figure 7:
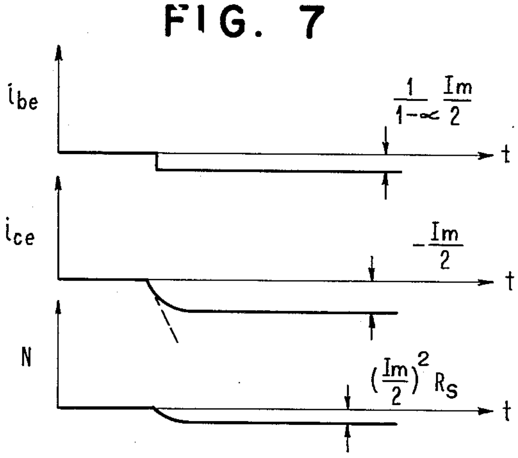
FIG. 7 shows current and output curves for the circuit of FIG. 5 with relation to time.

The operating point 64 is determined by the intersection of a collector load 66, of the equivalent resistance $(R_1+R_2)$, with the saturation line of the transistor 50 indicated as $Rs$. Here, a high power again exists between the base 52 and the collector 56; therefore, the control current fed into the base 52 is very low as is indicated in the FIG. 7 by the curve $i_{be}$. Considering the operating point 64 during the on state of the transistor, as shown in the FIG. 6, a very small voltage $V_{ce}$ is necessary and therefore, a corresponding low power loss is observed as is shown by the curve N in the FIG. 7. It should be noted, however, that the rise time of the current pulse $Im/2$, as indicated by the curve $i_{ce}$ in the FIG. 7, is relatively slow when compared with that in FIG. 4 for the circuit of FIG. 2.

Figure 8:
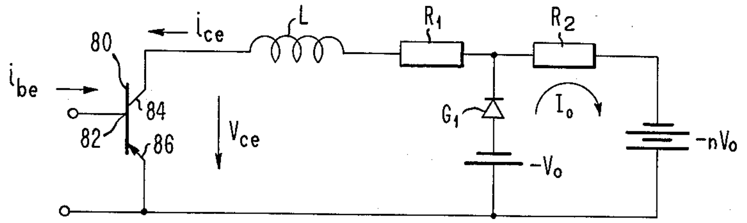
FIG. 8 is a circuit diagram of a pulse amplifier in accordance with this invention.

The basic circuit of this invention is shown in the FIG. 8 wherein the attributes of the circuits shown in the FIGS. 2 and 5; that is, fast rise time for the pulse $Im/2$, with small power loss during the on condition, is achieved. Referring to the FIG. 8, a grounded-emitter transistor 80 is provided having a base 82, a collector 84, and an emitter 86. The collector 84 is serially connected with the inductance L, resistances $R_1$ and $R_2$ as is shown in the FIG. 5, and a high potential battery labeled $nVo$, since $n$ is a multiple of the basic battery voltage $Vo$ indicated in the FIGS. 2 and 5. Connected intermediate the resistors $R_1$ and $R_2$ is a second parallel branch having a diode $G_1$ which is biased by the battery $Vo$. The diode $G_1$ is poled so that it is polarized in the forward direction for a basic current $Io$ which is driven by the battery $nVo$, where $n>1$, through the circuit, including the large resistor $R_2$, $G_1$ and battery $Vo$.

Figure 9:
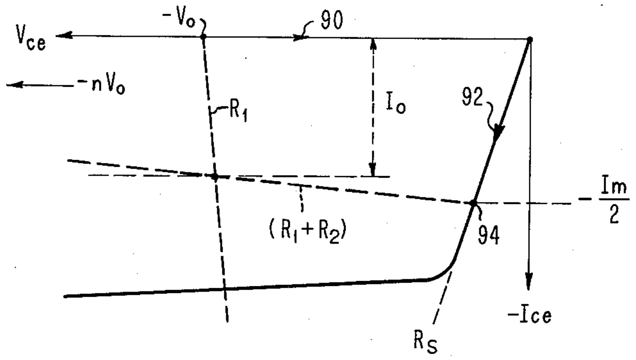
FIG. 9 represents operating points in the family of characteristic curves for the circuit of FIG. 8.
Figure 10:
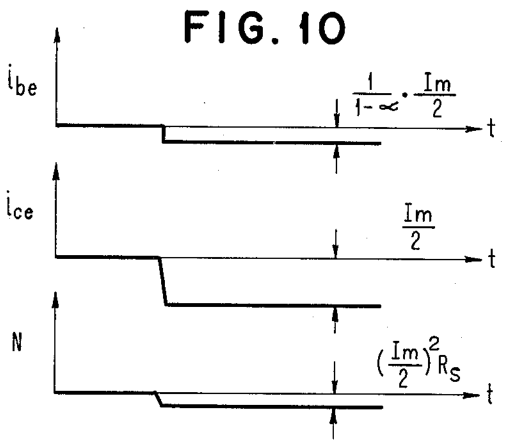
FIG. 10 shows current and output curves for the circuit of FIG. 8.

In the inactive, or blocked state, the transistor 80 has a voltage $V_{ce}$ no greater than that of the battery $Vo$. The operating point of the transistor 80 is then shown in the FIG. 9 to be at a point labeled $-Vo$. The load line, labeled $R_1$ then corresponds to the resistance $R_1$ and initially acts like the circuit of FIG. 2, with reference to the FIG. 3. Assuming a turn-on current pulse $i_{be}$, as shown in the FIG. 10, is supplied to the base 82 of the transistor 80, the current in the collector circuit, $i_{ce}$, will increase linearly with time due to the inductance L. Since the diode $G_1$ is biased in the forward direction as long as the collector current $i_{ce}$ is lower than or equal to the basic current $Io$ during a substantial portion, if not all of the turn-on process, a small time constant is effective and the rise time, as shown in the FIG. 10, of the current $Im/2$ is very fast. When the collector $i_{ce}$ exceeds the value of the basic current $Io$, the rectifier $G_1$ is cut off, thus removing the low resistance branch circuit $G_1$, $Vo$. The effective load circuit now includes the high resistance $R_2$. Considering the initial and final conditions which take place, as described above, when the transistor 80 is turned on, the operating point of the transistor 80 is seen to move in the FIG. 9 in accordance with an arrow 90 and an arrow 92 to an operating point 94. The operating point 94 is determined by a load line designated $(R_1+R_2)$ since once the initial small battery voltage $Vo$ is overcome, as described above, the diode $G_1$ in cutting off acts to include the high resistance $R_2$ in the load circuit. This operating point 94 is on the saturation line $Rs$, providing the collector current $i_{ce}$ with a magnitude of $Im/2$, and a small voltage drop $V_{ce}$ across the transistor 80. Thus, the circuit provides a fast rise pulse for the current $Im/2$, indicated in the FIG. 10, with a small power loss, as shown by the curve N, due to the small current $i_{be}$ and small voltage drop $V_{ce}$ during turn-on operation. The attributes of the circuits of FIGS. 2 and 5 are thus found in the construction of a circuit in accordance with FIG. 8.

Figure 11:
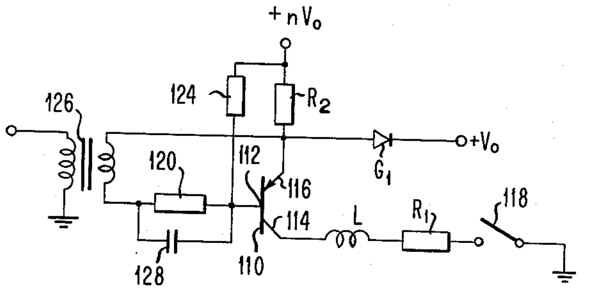
FIG. 11 illustrates a unipolar driver in accordance with this invention.

Since, as previously indicated, it is desirable to have both the write drivers 20 and 24 and the read drivers 22 and 26 for use in a memory as shown in the FIG. 1, a suitable circuit for use as a unipolar driver in such a memory is illustrated in the FIG. 11, which embodies the principles set forth above.

Referring to the FIG. 11, a transistor 110 is provided having a base 112, a collector 114 and an emitter 116. Since, in the FIG. 1, the switching transistors 16 and 18 fix the ground point of the circuit, the collector 114 is grounded through the matrix conductor (L, $R_1$) and the switching transistor 16 or 18 is shown in form of a simplified switch 118. The large resistance $R_2$ is series connected with the emitter 116 and to the high potential battery source $+nVo$ in accordance with the circuit of FIG. 8. Further, the diode $G_1$ is serially connected with the low potential battery source $+Vo$ and the emitter 116. The control input to the base 112 of the transistor 110 is provided by a voltage divider path 120 and 124 connected with a transformer 126 so that the base 112 receives a low positive bias which serves to securely block the transistor 110 in its inoperative condition and prevent small interference pulses from initiating turn-on. A capacitor 128 is connected across the voltage divider 120 to speed the switching of the transistor 110.

Figure 12:
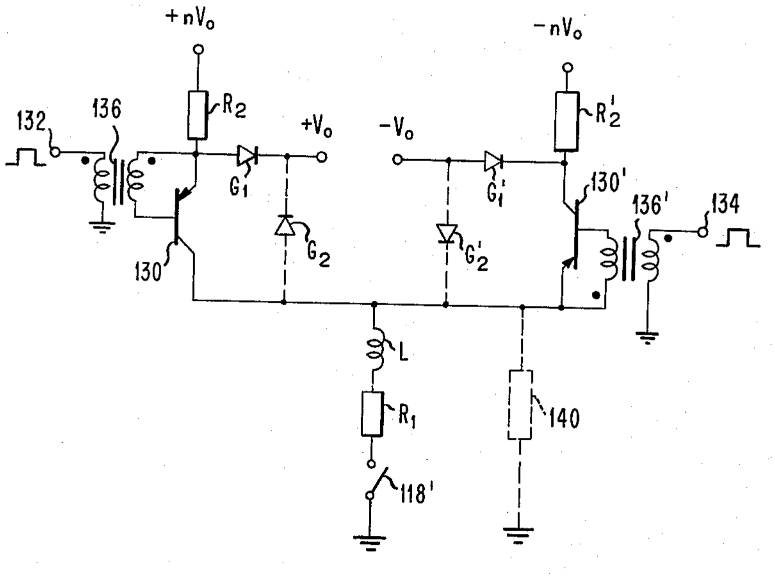
FIG. 12 represents a bi-polar driver utilizing similar transistors in accordance with this invention.

In accordance with the principles set forth in FIGS. 8 and 11, a bi-polar driver, adapted to provide read and write pulses to one coordinate selection line may be constructed as set forth in the FIG. 12.

Referring to the FIG. 12, two similar transistors 130 and 130′, which are preferably of the same conductivity type, are arranged so that one is controlled by an input to a terminal 132 and another is controlled by an input to a terminal 134. In order to simplify an understanding of this arrangement, the voltage dividers 120 and 124, shown in the circuit of FIG. 11, have been omitted and, as before, the basic voltages $Vo$ and $nVo$, the equivalent line L and $R_1$, and basic diode $G_1$, are shown similarly labeled. Each of the transistors 130 and 130′ have their base connected with the control terminals 132 and 134, respectively, through a coupling transformer 136 and 136′. The emitter of the transistor 130′ and the collector of the transistor 130 are connected with the common load circuit L, $R_1$ and a transistor switch 118′. The resistances $R_2$ and $R_2'$ have one end connected with a high potential battery $+nVo$ and $-nVo$, respectively, and the other end connected with the emitter of the transistor 130 and the collector of the transistor 130′, respectively. A further parallel circuit across each of the transistors 130 and 130′ comprises a diode $G_1$ and a low potential battery $Vo$. Thus, by employing transistors of one type, here PNP, a bi-polar driver may be constructed in accordance with this invention.

If, however, we wished to employ an NPN-type transistor, the circuit arrangement would differ slightly. Replacing the transistor 80 with an NPN type, the battery polarization would have to be reversed. Further, since the inductance L retains magnetic energy, voltage peaks will be produced at the termination of the pulse due to the sudden turn-off. These voltage peaks may be eliminated by arranging a diode in parallel to the inductance L which passes the induced turn-off voltage polarized oppositely to the pulse voltage.

In a bi-polar driver, this circuit arrangement cannot be employed due to the bi-polarity of the pulse voltages. Likewise, the possibility of connecting an ohmic resistance in parallel to the inductance L causes additional losses with a corresponding decrease in rise time. A damping resistance 140 connected as shown to cause a possible delayed connection would require additional controls and complicate the circuitry.

By providing a diode $G_2$ and $G_2'$, as is shown in the FIG. 12, which open one path each for all of the cut-off voltages higher than $+Vo$ and lower than $-Vo$ with the additional high resistance 140, a satisfactory arrangement is found, since the resistance 140 may absorb the remaining energy of the circuit.

In the interest of providing a complete disclosure, details of one embodiment of the circuits shown in the FIGS. 11 and 12 is given below; however, it is to be understood that other component values and voltage magnitudes may be employed with satisfactory operation attained so that the values given should not be considered limiting.

Transistors 39, 40, 32: Type OC 45, PNP junction transistor of Philips
Inductance L: $\approx 10/\mu h.$, corresponding to 2000 storage cores
Resistance $R_1$: $\approx 2$ ohms
Resistance $R_2$: $\approx 400$ ohms
Resistance 124=6 kilo-ohms
Resistance 120=100 ohms
Resistance 140=5 kilo-ohms
Condenser 128=10 nf.
Battery $Vo$=6 v.
Battery $nVo$=24 v.
Rectifier $G_1$: Diode OA 5
Rectifier $G_2$: Diode OA 180

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a pulse amplifying circuit, a semi-conductive device exhibiting an output characteristic including at least a saturation region and having a blocked and an unblocked state, load means including a high potential source series connected with a high resistance and in parallel thereto a low potential source series connected with an asymmetrical impedance device so that a small constant current flows in said load when said semi-conductor device is in the blocked state, and means connecting said semi-conductive device to said load to cause the effective impedance of said load to change in response to the magnitude of current flow therethrough when said semi-conductive device is in the unblocked state and operated in its saturation region.

2. A device as set forth in claim 1, wherein said asymmetrical impedance device is adapted to block current flow therethrough when said semi-conductive device is in the unblocked state and the current flow therefrom is equal to the current flow from the low potential source.

3. A device as set forth in claim 2, wherein said semi-conductive device has a base, collector and emitter electrode and said load is connected in series with the collector in a common emitter-type circuit.

4. A device as set forth in claim 3, wherein said load comprises a further impedance serially connected with said emitter electrode which is substantially inductive.

5. In a bi-polar pulse amplifying device, a first and a second semi-conductive device each of which exhibits an output characteristic, including a saturation region and is capable of being operated in a blocked and an unblocked state, each said semi-conductive device having a base, collector and emitter electrode, load means, including a high potential source series connected with a high resistance, and in a parallel thereto a low potential source series connected with an asymmetrical impedance device associated with each said semi-conductive device so that a small constant current flows in each said associated load when said semi-conductive device is in the blocked state, means connecting the collector of said first semi-conductive device and the emitter of said second semi-conductive device to a common impedance and further connecting the emitter of said first semi-conductive device and the collector of said second semi-conductive device with their associated load so that the effective impedance of the respective loads change in response to the magnitude of current flow therethrough when the respective semi-conductive device is in the unblocked state and operated in its saturation region.

6. A device as set forth in claim 5, wherein said common impedance is substantially inductive.

7. A device as set forth in claim 6, including a further asymmetrical impedance device in each said associated load having one end connected to one side of the low potential source and the other connected with the common impedance so that the cut-off potential of said common load is limited to the potential of said low potential source.

8. A device as set forth in claim 7, including a further resistor connected across the common load.

9. A device as set forth in claim 8 wherein each said semi-conductive devices are transistors.

10. In a bi-polar pulse amplifying device, a first and a second semi-conductive device each of which exhibits an output characteristic including a saturation region and is capable of being operated in a blocked and an unblocked state, load means, including a high potential source series connected with a high resistance and in parallel thereto, a low potential source series connected with an asymmetrical impedance device associated with each said semi-conductive device so that a small constant current flows in each said associated load when said semi-conductive device is in the blocked state, means connecting a first electrode of said semi-conductive devices to an appropriate biasing potential to establish conduction therethrough, further means connecting a further electrode of each said semi-conductive device to a common impedance and further connecting another electrode of said semi-conductive devices with their associated load so that the effective impedance of the respective loads change in response to the magnitude of the current flow therethrough when the respective semi-conductive device is in the unblocked state and operated in its saturation region.

11. A device as set forth in claim 10, wherein said semi-conductive devices are of the same conductivity type.

12. A device as set forth in claim 10 wherein said common impedance is substantially inductive.

13. A device as set forth in claim 12, including a further asymmetrical impedance device in each said associated load, having one end connected to one side of the load potential source and the other connected with the common impedance so that the cut-off potential of said common load is limited to the potential of said load potential source.

14. A device as set forth in claim 13, including a further resistor connected across the common load.

References Cited in the file of this patent

UNITED STATES PATENTS

| | | |
|---|---|---|
| 2,695,993 | Haynes | Nov. 30, 1954 |
| 2,730,576 | Caruthers | Jan. 10, 1956 |
| 2,872,594 | Logue | Feb. 3, 1959 |
| 2,888,578 | Bruce et al. | May 26, 1959 |